(12) United States Patent
Shibayama et al.

(10) Patent No.: US 11,282,622 B2
(45) Date of Patent: Mar. 22, 2022

(54) FERRITE COMPOSITION AND MULTILAYER ELECTRONIC COMPONENT

(71) Applicant: TDK CORPORATION, Tokyo (JP)

(72) Inventors: Takeshi Shibayama, Tokyo (JP); Takashi Suzuki, Tokyo (JP); Takahiro Sato, Tokyo (JP); Kenji Komorita, Tokyo (JP); Tatsuro Suzuki, Tokyo (JP); Yukio Takahashi, Tokyo (JP); Hiroyuki Tanoue, Tokyo (JP); Yasuhiro Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 44 days.

(21) Appl. No.: 16/727,553

(22) Filed: Dec. 26, 2019

(65) Prior Publication Data

US 2020/0243239 A1 Jul. 30, 2020

(30) Foreign Application Priority Data

Jan. 29, 2019 (JP) .............................. JP2019-013178

(51) Int. Cl.
*B32B 9/00* (2006.01)
*H01F 1/34* (2006.01)
*C04B 35/26* (2006.01)

(52) U.S. Cl.
CPC ......... *H01F 1/344* (2013.01); *C04B 35/2666* (2013.01); *C04B 2235/3274* (2013.01); *C04B 2235/3418* (2013.01); *C04B 2235/3427* (2013.01); *C04B 2235/763* (2013.01); *C04B 2235/85* (2013.01)

(58) Field of Classification Search
None
See application file for complete search history.

(56) References Cited

U.S. PATENT DOCUMENTS

| | | | |
|---|---|---|---|
| 6,287,479 B1 | 9/2001 | Tanaka | |
| 2010/0163779 A1 | 7/2010 | Okano et al. | |
| 2015/0097137 A1 | 4/2015 | Wada et al. | |
| 2016/0293302 A1* | 10/2016 | Kakuda | ................... H01F 1/344 |

FOREIGN PATENT DOCUMENTS

| | | | |
|---|---|---|---|
| CN | 106045492 A | 10/2016 | |
| CN | 109053178 A | 12/2018 | |
| JP | H02137301 A | * 11/1988 | |
| JP | 2000-252112 A | 9/2000 | |
| JP | 2008-290931 A | 12/2008 | |
| JP | 2013-060332 A | 4/2013 | |
| JP | 5582279 B2 | 9/2014 | |

* cited by examiner

*Primary Examiner* — Seth Dumbris
*Assistant Examiner* — Kim S. Horger
(74) *Attorney, Agent, or Firm* — Oliff PLC (57) ABSTRACT

A ferrite composition includes a main component and a sub-component. The main component includes 10.0 to 38.0 mol % of a Fe compound in terms of $Fe_2O_3$, 3.0 to 11.0 mol % of a Cu compound in terms of CuO, 39.0 to 80.0 mol % (excluding 39.0 mol %) of a Zn compound in terms of ZnO, and a balance of a Ni compound. The sub-component includes 10.0 to 23.0 parts by weight of a Si compound in terms of $SiO_2$, 0 to 3.0 parts by weight (including 0 parts by weight) of a Co compound in terms of $Co_3O_4$, and 0.1 to 3.0 parts by weight of a Bi compound in terms of $Bi_2O_3$ with respect to 100 parts by weight of the main component.

5 Claims, 8 Drawing Sheets

FERRITE COMPOSITION AND MULTILAYER ELECTRONIC COMPONENT

BACKGROUND OF THE INVENTION

The present invention relates to a ferrite composition and a multilayer electronic component.

In accordance with the adoption of NFC technology and non-contact power supply to ICT equipment, the increase in AC current for circuits of ICT equipment has been recently advancing, and noise removal products for the large current are demanded.

Examples of the noise removal products include winding-wire type ferrite inductors and multilayer type ferrite inductors. In use environment of large current as mentioned above, winding-wire type ferrite inductors are employed in view of height in noise removal characteristics. However, noise removal characteristics equal to or greater than those of winding-wire type ferrite inductors are also demanded for multilayer type ferrite inductors.

Patent Document 1 and Patent Document 2 disclose a ferrite composition having excellent characteristics by controlling its composition and a multilayer electronic component.

Patent Document 1: JP5582279 (B2)
Patent Document 2: JP2013060332 (A)

BRIEF SUMMARY OF INVENTION

However, a ferrite composition and a multilayer electronic component having more excellent characteristics are now demanded.

The present invention has been achieved under such circumstances. It is an object of the invention to provide a ferrite composition or so having improved inductance characteristics or so.

To achieve the above object, a ferrite composition according to the present invention includes a main component and a sub-component, wherein the main component includes 10.0 to 38.0 mol % of a Fe compound in terms of $Fe_2O_3$, 3.0 to 11.0 mol % of a Cu compound in terms of CuO, 39.0 to 80.0 mol % (excluding 39.0 mol %) of a Zn compound in terms of ZnO, and a balance of a Ni compound, and the sub-component includes 10.0 to 23.0 parts by weight of a Si compound in terms of $SiO_2$, 0 to 3.0 parts by weight (including 0 parts by weight) of a Co compound in terms of $Co_3O_4$, and 0.1 to 3.0 parts by weight of a Bi compound in terms of $Bi_2O_3$ with respect to 100 parts by weight of the main component.

The ferrite composition according to the present invention has the above features and thereby has improved inductance characteristics, high resistivity and permeability $\mu'$, and favorable DC superposition characteristics and AC resistance. Incidentally, permeability $\mu'$ is a real part of complex permeability.

The sub-component may include 0.1 to 1.0 parts by weight of a Co compound in terms of $Co_3O_4$.

The ferrite composition according to the present invention may be composed of a main phase composed of spinel ferrite, a first sub-phase including a $Zn_2SiO_4$ phase, and a grain boundary phase including a $SiO_2$ phase.

The ferrite composition according to the present invention may further include a second sub-phase including a $SiO_2$ phase.

A multilayer electronic component according to the present invention includes a coil conductor and ceramic layers, wherein the ceramic layers are composed of the above-mentioned ferrite composition.

Since the ceramic layers are composed of the above-mentioned ferrite composition, the electronic component according to the present invention can demonstrate noise removal characteristics equal to or greater than those of a wire-winding type coil device even though the electronic component according to the present invention is a multilayer type electronic component.

DETAILED DESCRIPTION OF INVENTION

Figure 1:
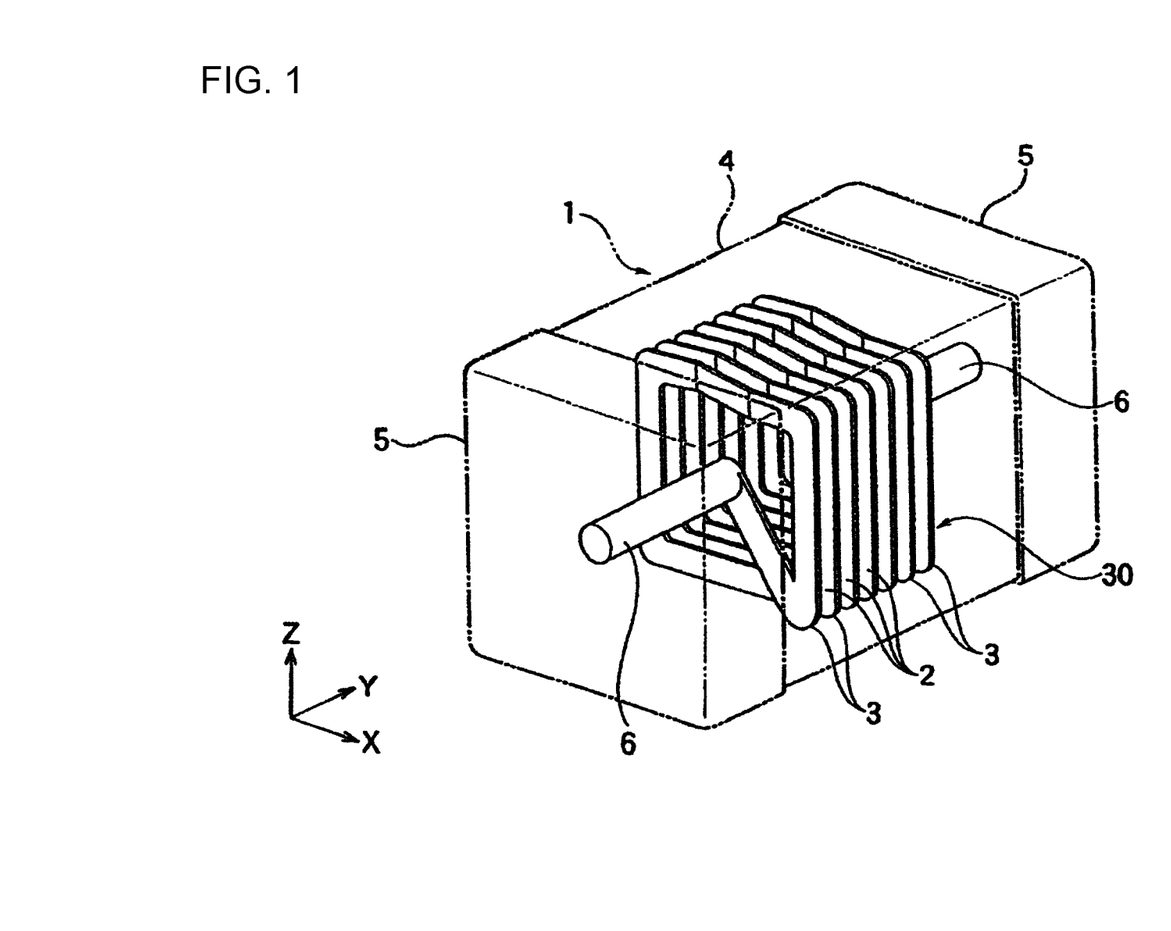
FIG. 1 is an internally transparent perspective view of a multilayer chip coil as an electronic component according to an embodiment of the present invention.

Hereinafter, the present invention is explained based on embodiments shown in the figures. As shown in FIG. 1, a multilayer chip coil 1 as an electronic component according to an embodiment of the present invention includes a chip body 4 containing ceramic layers 2 and internal electrode layers 3 alternately laminated in the Y-axis direction.

Each of the internal electrode layers 3 has a square ring shape, a C shape, or a U shape. The internal electrode layers 3 are spirally connected by a stepped electrode or a through hole electrode (not shown) for connecting internal electrodes going through the adjacent ceramic layers 2 and constitute a coil conductor 30.

Terminal electrodes 5 and 5 are formed on both ends of the chip body 4 in the Y-axis direction. Each of the terminal electrodes 5 is connected with an end of a terminal-connection through hole electrode 6 going through the laminated ceramic layers 2. The terminal electrodes 5 and 5 are connected with both ends of the coil conductor 30 forming a closed-magnetic-path coil (winding wire pattern).

In the present embodiment, the ceramic layers 2 and the internal electrode layers 3 are laminated in the Y-axis direction, and the end surfaces of the terminal electrodes 5 and 5 are parallel to the X-axis and the Z-axis. The X-axis, the Y-axis, and the Z-axis are perpendicular to each other. In the multilayer chip coil 1 shown in FIG. 1, the winding axis of the coil conductor 30 substantially corresponds to the Y-axis.

The chip body 4 has any outer shape and size that can approximately be determined based on purposes, but normally has a substantially rectangular parallelepiped shape with, for example, a length of 0.15 to 0.8 mm in the X-axis direction, a length of 0.3 to 1.6 mm in the Y-axis direction, and a length of 0.1 to 1.0 mm in the Z-axis direction.

The ceramic layers 2 have any thickness between electrodes and any base thickness. The ceramic layers 2 can have a thickness between electrodes (an interval between the internal electrode layers 3 and 3) of about 3 to 50 μm and a base thickness (a length of the terminal-connection through hole electrode 6 in the Y-axis direction) of about 5 to 300 μm.

In the present embodiment, the terminal electrodes 5 are not limited and are formed by attaching a conductive paste whose main component is Ag, Pd, etc. onto the outer surface of the body 4, firing the paste, and subjecting it to an electric plating. The electric plating can be carried out using Cu, Ni, Sn, etc.

The coil conductor 30 contains Ag (including an Ag alloy) and is composed of Ag alone, Ag—Pd alloy, or the like. The coil conductor 30 can contain a sub-component of Zr, Fe, Mn, Ti, and an oxide thereof.

The ceramic layers 2 are composed of a ferrite composition according to an embodiment of the present invention. Hereinafter, the ferrite composition is explained in detail.

The ferrite composition according to the present embodiment contains a main component of a Fe compound, a Cu compound, a Zn compound, and a Ni compound. For example, the Fe compound may include $Fe_2O_3$, the Cu compound may include CuO, the Zn compound may include ZnO, and the Ni compound may include NiO.

In 100 mol % of the main component, the amount of the Fe compound is 10.0 to 38.0 mol %, preferably 20.7 to 34.3 mol %, in terms of $Fe_2O_3$. When the amount of the Fe compound is large, DC superposition characteristics and resistivity are easy to decrease. When the amount of the Fe compound is small, permeability μ' is easy to decrease.

In 100 mol % of the main component, the amount of the Cu compound is 3.0 to 11.0 mol %, preferably 3.6 to 5.9 mol %, in terms of CuO. When the amount of the Cu compound is large, DC superposition characteristics are easy to decrease, AC resistance is easy to increase, and resistivity is easy to decrease. When the amount of the Cu compound is small, sinterability deteriorates (particularly, sintering density in low temperature sintering is easy to decrease), resistivity is easy to decrease due to deterioration of sinterability, and permeability μ' is easy to decrease.

In 100 mol % of the main component, the amount of the Zn compound is 39.0 to 80.0 mol % (excluding 39.0 mol %), preferably 46.2 to 61.8 mol %, in terms of ZnO. When the amount of the Zn compound is large, permeability μ' is easy to decrease. When the amount of the Zn compound is small, DC superposition characteristics are easy to decrease, and AC resistance is easy to increase.

The balance of the main component is composed of the Ni compound. In 100 mol % of the main component, the amount of the Ni compound is preferably 47.0 mol % or less, more preferably less than 40.0 mol %, in terms of NiO. The amount of the Ni compound has any lower limit, such as 0.1 mol %. When the amount of the Ni compound is large, DC superposition characteristics are easy to decrease, and AC resistance is easy to increase.

In addition to the above-mentioned main component, the ferrite composition according to the present embodiment includes a sub-component of a Si compound and a Bi compound and may further include a Co compound.

In 100 parts by weight of the main component, the amount of the Si compound is 10.0 to 23.0 parts by weight, preferably 14.8 to 22.0 parts by weight, in terms of $SiO_2$. When the amount of the Si compound is large, sinterability deteriorates, and permeability μ' is easy to decrease. When the amount of the Si compound is small, DC superposition characteristics are easy to decrease, and AC resistance is easy to increase.

In 100 parts by weight of the main component, the amount of the Co compound is 0 to 3.0 parts by weight (including 0 parts by weight) in terms of $Co_3O_4$. That is, the Co compound may not be contained. The amount of the Co compound is preferably 0 to 1.0 parts by weight, but may be 0.1 to 1.0 parts by weight. When the amount of the Co compound is large, permeability μ' is easy to decrease. The smaller the Co content is, the smaller the loss is particularly in using the ferrite composition at high frequency.

In 100 parts by weight of the main component, the amount of the Bi compound is 0.1 to 3.0 parts by weight, preferably 1.2 to 3.0 parts by weight, in terms of $Bi_2O_3$. When the amount of the Bi compound is large, resistivity is easy to decrease, DC superposition characteristics are easy to decrease, AC resistance is easy to increase, and permeability μ' is easy to decrease. When the amount of the Bi compound is small, resistivity is easy to decrease, a sufficient sinterability is hard to be obtained (particularly, density is easy to decrease at low temperature sintering), and permeability μ' is easy to decrease.

The Bi compound has an effect of promoting the generation of $Zn_2SiO_4$ in sintering step. When bismuth oxide is added in pulverization of a calcined material, the effect of promoting the generation of $Zn_2SiO_4$ is particularly large.

Preferably, (the amount of the Co compound in terms of $Co_3O_4$)/(the amount of the Si compound in terms of $SiO_2$) (hereinafter, simply referred to as "Co/Si") is 0 to 0.300 in weight ratio. More preferably, Co/Si is 0.005 to 0.100. Even if the amount of the Co compound and the amount of the Si compound are within the above-mentioned ranges, permeability μ' is easy to decrease when Co/Si is high, and density is easy to decrease when Co/Si is low.

Incidentally, when the ferrite composition is manufactured, the amount of each constituent of the main component and the sub-component does not substantially change from a step of the raw material powder to a step after firing.

In the ferrite composition according to the present embodiment, the composition range of each constituent of the main component is controlled to the above-mentioned range, and the sub-component of the Si compound, the Co compound, and the Bi compound is additionally contained within each of the above-mentioned ranges. It is consequently possible to obtain a ferrite composition having a favorable sinterability, high resistivity and permeability and favorable DC superposition characteristics and AC resistance. In addition, the ferrite composition according to the present embodiment can be sintered at about 900° C., which is equal to or lower than the melting point of Ag (used as the internal electrodes), and is thereby applicable to various purposes.

Apart from the sub-component, the ferrite composition according to the present embodiment may include an additional component of manganese oxide (e.g., $Mn_3O_4$), zirconium oxide, tin oxide, magnesium oxide, glass compound, etc. as long as the effects of the present invention are not disturbed. The amount of the additional component is not limited and is, for example, about 0.05 to 1.0 parts by weight with respect to 100 parts by weight of the main component.

In particular, the amount of magnesium oxide is preferably 0.5 parts by weight or less (including zero). When the amount of magnesium oxide is 0.5 parts by weight or less, the reaction between MgO and $SiO_2$ is prevented, and the following first sub-phase composed of $Zn_2SiO_4$ phase is easily generated.

Moreover, the ferrite composition according to the present embodiment may contain an oxide of inevitable impurity elements.

The inevitable impurity elements are elements other than the above-mentioned elements. More specifically, the inevitable impurities are C, S, Cl, As, Se, Br, Te, I, Li, Na, Mg, Al, Ca, Ga, Ge, Sr, Cd, In, Sb, Ba, Pb, Sc, Ti, V, Cr, Y, Nb, Mo, Pd, Ag, Hf, Ta, etc. The oxide of the inevitable impurity elements may be contained as long as its amount is about 0.05 parts by weight or less in the ferrite composition.

In particular, when the Al content is 0.05 parts by weight or less with respect to 100 parts by weight of the main component in terms of $Al_2O_3$, sinterability and resistivity are easy to improve.

Figure 3A:
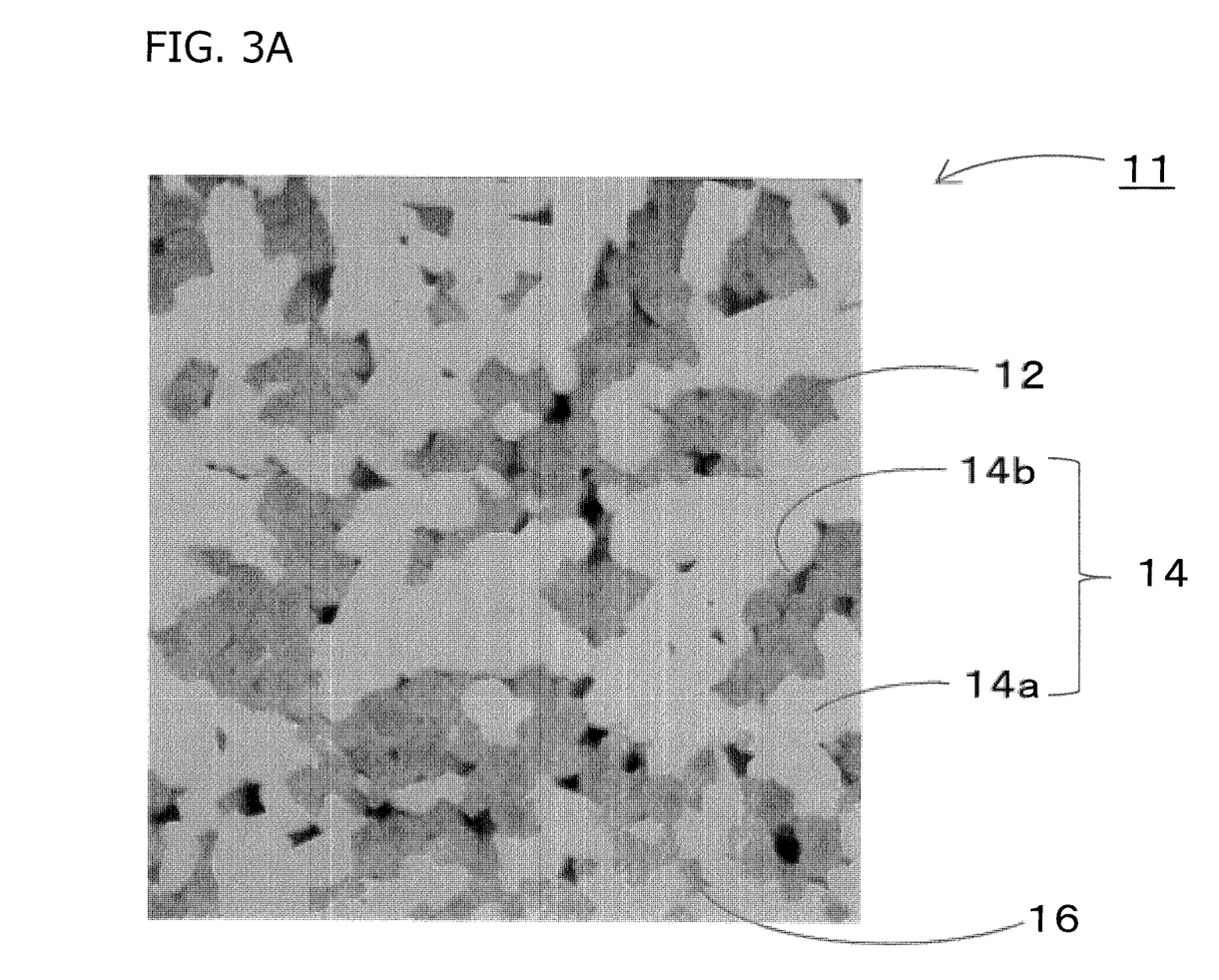
FIG. 3A is an EPMA image of a ferrite composition according to the present invention.
Figure 3B:
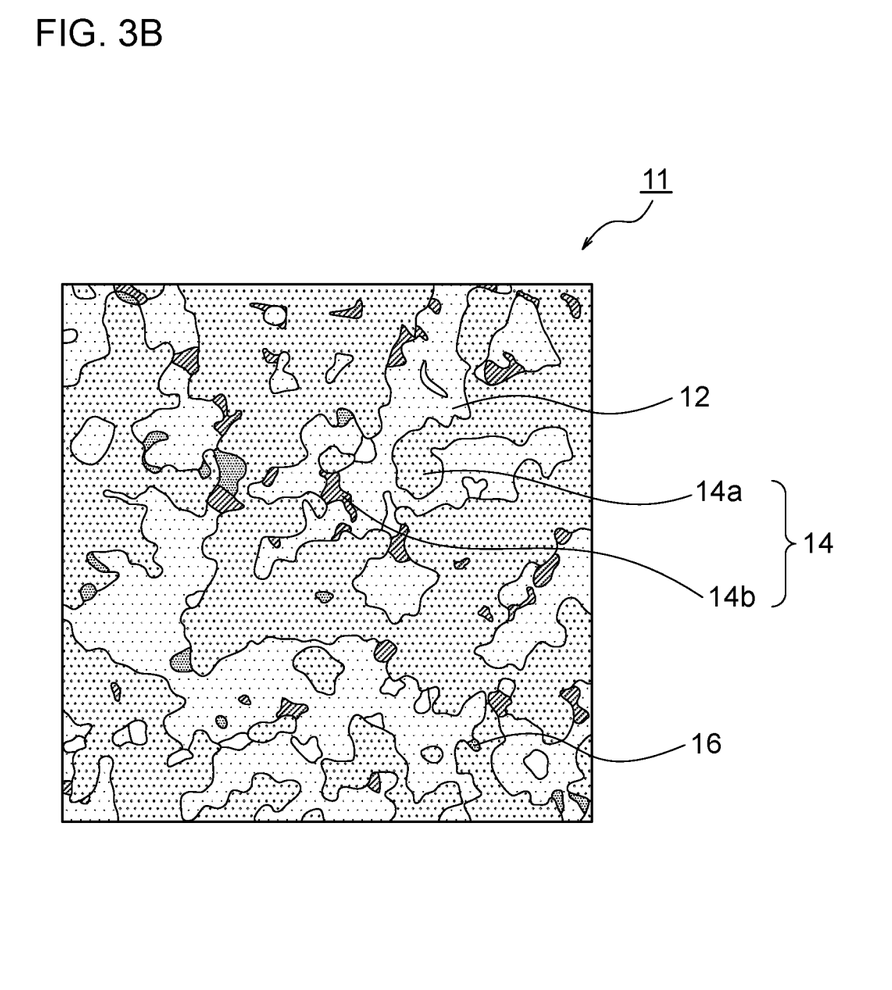
FIG. 3B is a schematic view of a ferrite composition according to the present invention.

Preferably, the ferrite composition according to the present embodiment has the above-mentioned composition and a composite structure as shown in FIG. 3A and FIG. 3B.

FIG. 3A is an observation result of a ferrite composition 11 according to the present embodiment (No. 2 mentioned below) at a magnification of 20000 times by STEM-EDS. FIG. 3B is a schematic view of FIG. 3A. A favorable ferrite composition 11 contains a main phase 12 composed of spinel ferrite and further contains a first sub-phase 14a composed of $Zn_2SiO_4$ phase and a second sub-phase 14b composed of $SiO_2$ phase. Moreover, a grain boundary phase 16 composed of $SiO_2$ phase is contained among the phases (the main phase 12, the first sub-phase 14a, and the second sub-phase 14b). The second sub-phase 14b composed of $SiO_2$ phase may not be contained, but is preferably contained. In the first sub-phase 14a, other elements, such as Ni, Cu, and Co, may be contained and may be solid-soluted in $Zn_2SiO_4$. The second sub-phase 14b may contain other elements, such as Fe and Ni. In addition to $SiO_2$, the grain boundary phase 16 contains $Bi_2O_3$ more than the main phase 12 does. Incidentally, the second sub-phase 14b and the grain boundary phase 16 are provisionally distinguished in FIG. 3A and FIG. 3B. Specifically, the second sub-phase 14b is a portion where a content ratio of $SiO_2$ is larger than that of $Bi_2O_3$ by molar ratio, and the grain boundary phase 16 is a portion where a content ratio of $SiO_2$ is equal to or lower than that of $Bi_2O_3$ by molar ratio. The second sub-phase 14b and the grain boundary phase 16 can accurately be distinguished by the following observation using a STEM-EDS at a higher magnification.

Compared to the main phase 12 composed of spinel ferrite, the first sub-phase 14a composed of $Zn_2SiO_4$ phase, the second sub-phase 14b containing $SiO_2$, and the grain boundary phase 16 containing $SiO_2$ have a small thermal expansion coefficient. Thus, each phase having a small thermal expansion coefficient applies a tensile stress to the main phase 12 having a large thermal expansion coefficient. This improves inductance characteristics of a coil device using the ferrite composition 11.

In the ferrite composition 11 according to the present embodiment, the proportion of the sub-phases 14 to the total of the main phases 12, the sub-phases 14 (whose composition is different from that of the main phase 12), and the grain boundary phases 16 is larger than that of conventional ferrite compositions. Specifically, in a STEM-EDS image with a magnification that is 20000 times or more and can observe the main phase 12, the total area of the sub-phases 14 is preferably 50% or more and 70% or less with respect to 100% of the total area of the main phases 12, the sub-phases 14, and the grain boundary phases 16. In particular, the ratio of the first sub-phase 14a composed of $Zn_2SiO_4$ phase is preferably larger than that of the second sub-phase 14b in the sub-phase 14. The ratio of the first sub-phase 14a may be larger than that of the main phase 12.

When the total area of the sub-phases 14 is 50% or more, the above-mentioned tensile stress is sufficiently applied. Moreover, when the total area of the sub-phases 14 is 50% or more, the area ratio of the sub-phases 14, which are non-magnetic and hard to be passed by magnetic flux, is large. The ferrite composition 11 has a three-dimensional structure where the main phases 12 and the sub-phases 14 are tangled. Thus, the ferrite composition 11 has a complex structure where the main phases 12 (magnetic phases) and the sub-phases 14 (non-magnetic phases) are dispersed. Here, it is easier for magnetic flux to pass through the main phases 12 (magnetic phases) than through the sub-phases 14 (non-magnetic phases). Thus, the magnetic path length of magnetic flux mainly passing through the main phases 12 (magnetic phases) is large, and the magnetic path length of magnetic flux passing through the sub-phases 14 (non-magnetic phases) is comparatively small. As a result, the ferrite composition 11 has a three-dimensional magnetic path structure, and an effect of reducing magnetic saturation by minor multiple gaps (dispersion gap effect) is large. Since the dispersion gap effect is large, the coil device composed of the ferrite composition 11 has improved inductance characteristics particularly when used with large electric current, a high permeability μ', and favorable DC superposition characteristics and AC resistance.

Preferably, the area of the first sub-phases 14a is 30% or more and 70% or less. Preferably, the area of the second sub-phases 14b is 0.5% or more and 10% or less. Incidentally, the area of the main phases 12 is preferably 30% or more and 50% or less, and the area of the grain boundary phases 16 is preferably 0.1% or more and 4.0% or less.

In the present embodiment, $Zn_2SiO_4$ phase is a phase containing $Zn_2SiO_4$, $SiO_2$ phase is a phase where a content ratio of $SiO_2$ is higher than that of the main phases, and $Bi_2O_3$ phase is a phase where a content ratio of $Bi_2O_3$ is higher than that of the main phases. Incidentally, as mentioned below, there may be a phase composed of $SiO_2$ phase and $Bi_2O_3$ phase.

Figure 4A:
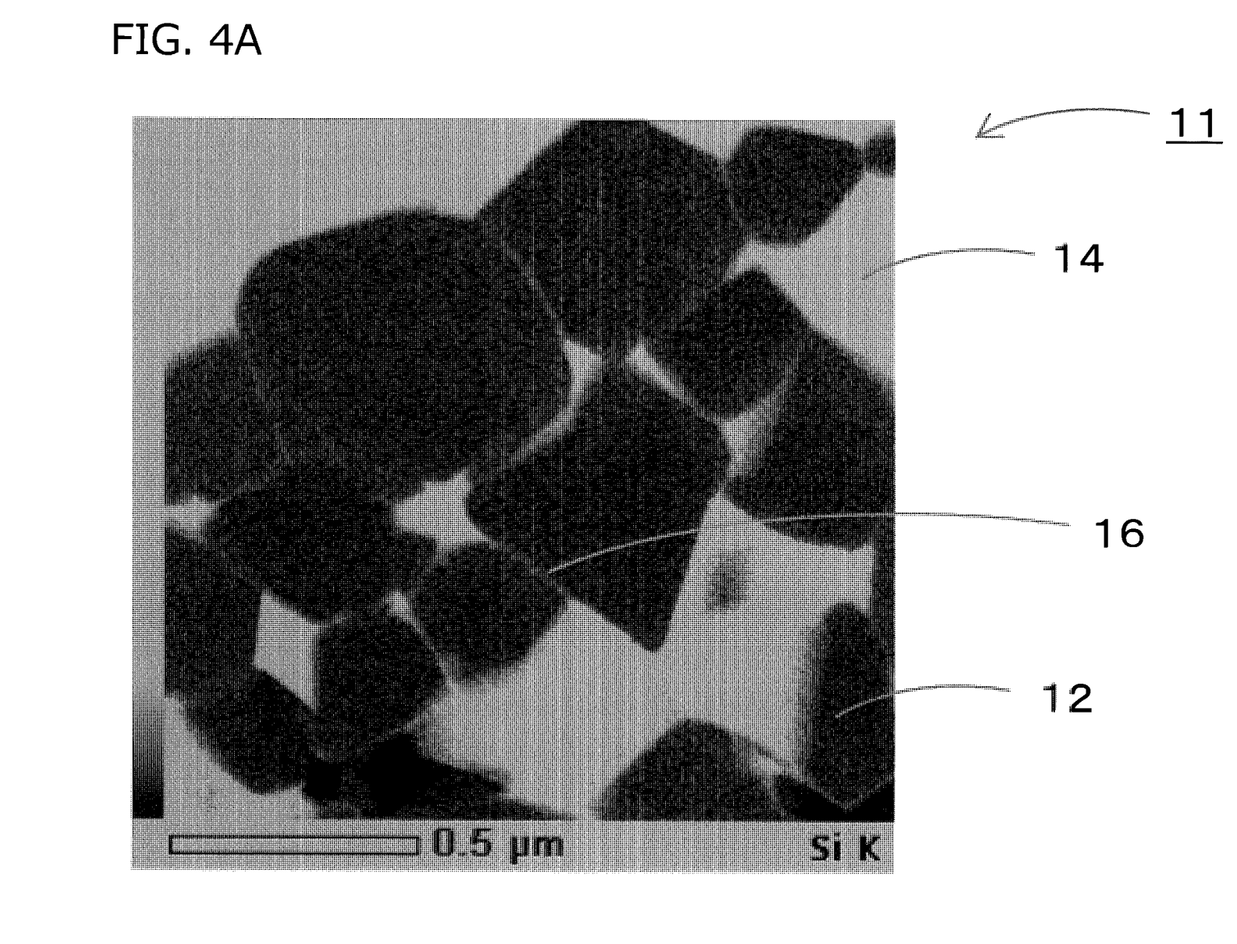
FIG. 4A is a Si element mapping image of a ferrite composition according to the present invention.
Figure 4B:
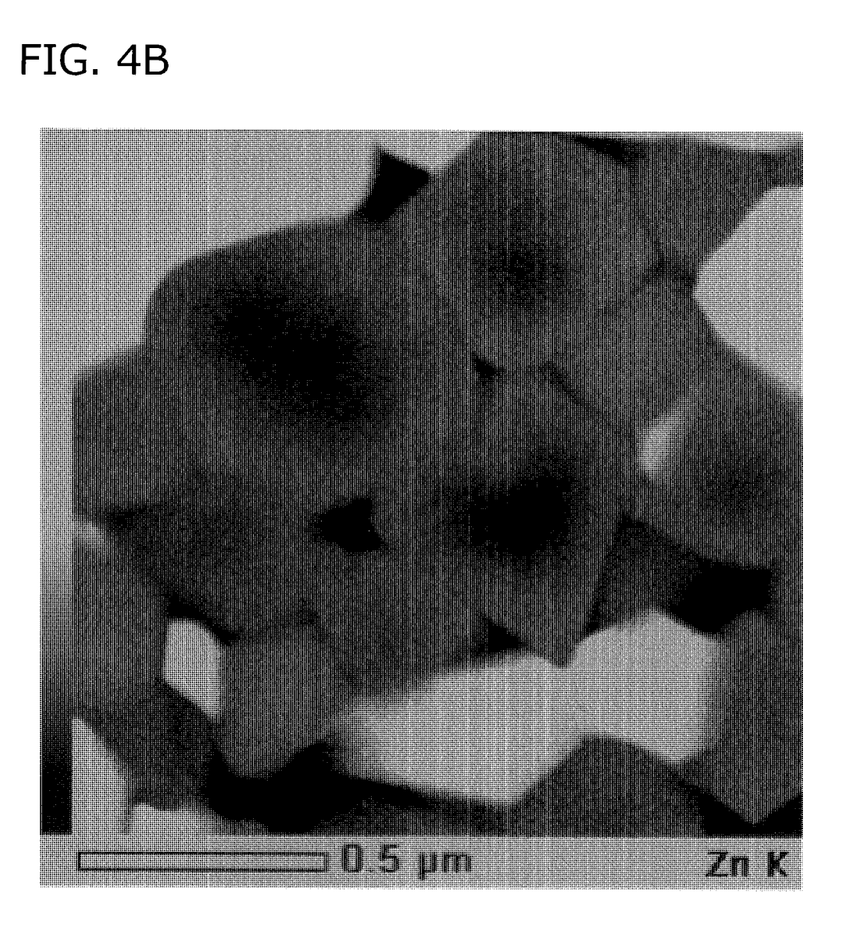
FIG. 4B is a Zn element mapping image of a ferrite composition according to the present invention.
Figure 4C:
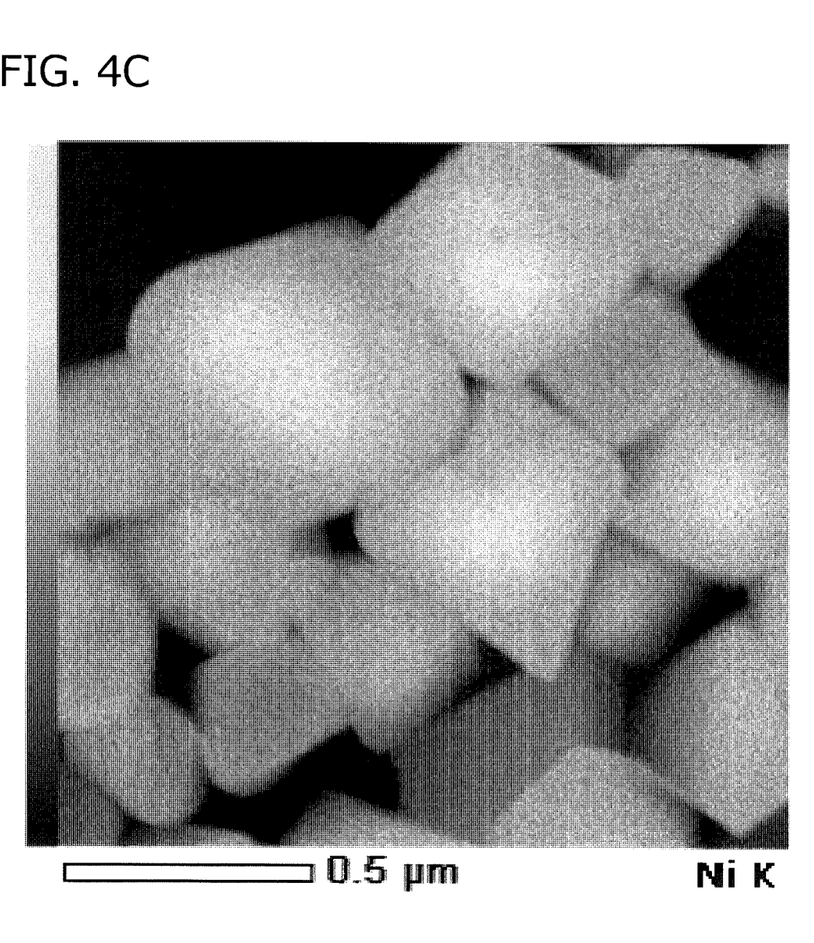
FIG. 4C is a Ni element mapping image of a ferrite composition according to the present invention.
Figure 5:
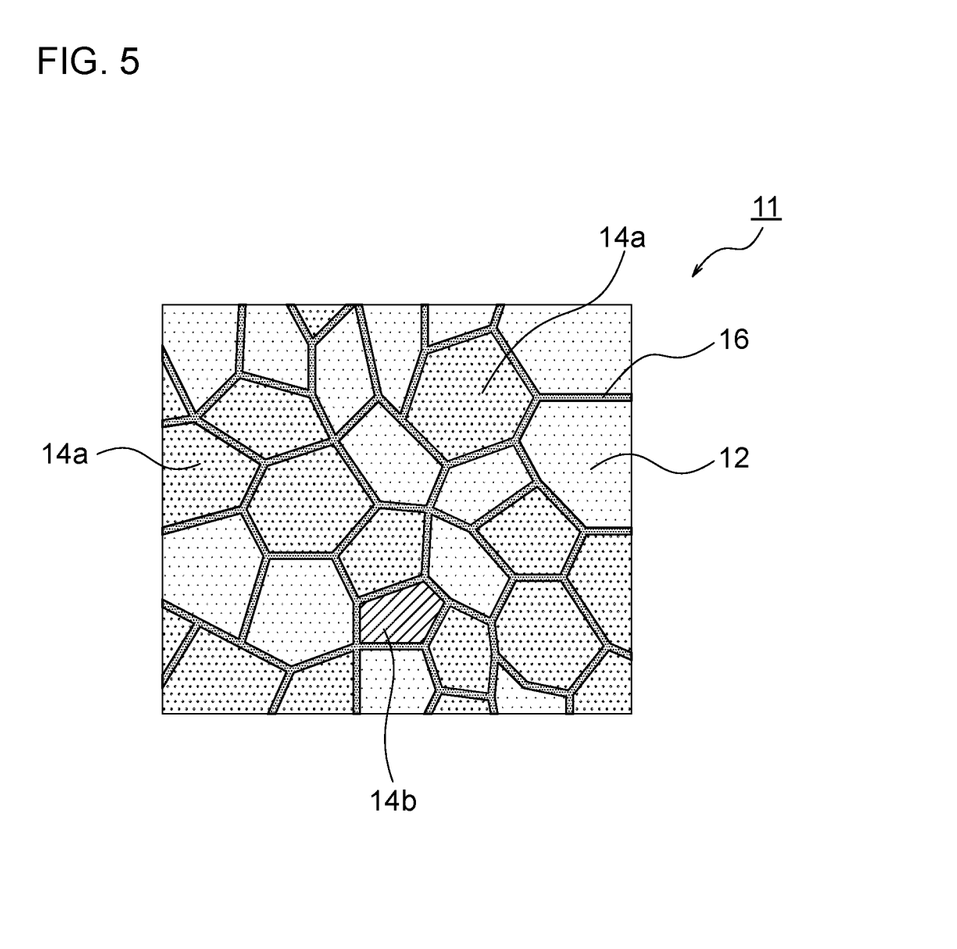
FIG. 5 is a schematic view of a ferrite composition according to the present invention.

FIG. 4A to FIG. 4C are a Si element mapping image, a Zn element mapping image, and a Ni element mapping image, respectively, of the ferrite composition 11 (No. 2) according to the present embodiment obtained using a STEM-EDS at a magnification of 100000 times. FIG. 5 is a schematic view of FIG. 4A to FIG. 4C.

Any method can be used for confirming whether the sub-phases 14 in FIG. 4A to FIG. 4C and FIG. 5 are the first sub-phases 14a or the second sub-phases 14b.

According to FIG. 4A to FIG. 4C and FIG. 5 with a higher observation magnification compared to FIG. 3A and FIG. 3B, the grain boundary phase 16 composed of $SiO_2$ phase is present among the phases (the main phase 12, the first sub-phase 14a, and the second sub-phase 14b), and there can be seen a core-shell structure where a shell containing $SiO_2$ surrounds a core (the main phase or the sub-phase).

There is no limit to a concentration distribution of Zn contained in the main phase 12. For example, the concentration distribution of Zn may be uniform, but the concentration of Zn is preferably comparatively high in an outer part of the main phase 12 close to the grain boundary phase 16. In the outer part of the main phase 12 close to the grain boundary phase 16, the concentration of Ni is preferably comparatively low, and the concentration of Si is preferably comparatively high. In particular, when the mapping image of Zn and the mapping image of Ni are observed, the above-mentioned concentration distribution of the main phase 12 can be confirmed by a gradation generated in the main phase 12. When the main phase 12 has such a concentration distribution, the above-mentioned tensile stress is considered to be transmitted efficiently.

Incidentally, as mentioned above, the grain boundary phase 16 also contains $Bi_2O_3$. The fact that the grain boundary phase 16 is $Bi_2O_3$ phase and $SiO_2$ phase can be confirmed by, for example, a line analysis of a portion passing through the main phase 12 and the grain boundary phase 16 using a STEM-EDS.

When the ferrite composition 11 according to the present embodiment contains the grain boundary phases 16 ($SiO_2$ phase), the ratio of the grain boundary phases 16 is larger than that of grain boundary phases of conventional ferrite compositions. This means that the grain boundary phases 16 are thicker than those of conventional ferrite compositions. Then, the grain boundary phases 16 ($SiO_2$ phase), whose thermal expansion coefficient is different from that of the main phases 12, are contained and cover each phase, and a tensile stress is thereby applied from the grain boundary phases 16 to each phase. When the tensile stress is sufficiently applied, the ferrite composition 11 has improved inductance characteristics, high resistivity and permeability and favorable DC superposition characteristics and AC resistance. In the present embodiment, the area of the grain boundary phases 16 is preferably 0.1% or more and 4.0% or less with respect to 100% of the total area of the main phases 12, the sub-phases 14, whose thermal expansion coefficient is different from that of the main phases 12, and the grain boundary phases 16 in a STEM-EDS image that is large enough to observe the main phases 12 at a magnification of 20000 times or more.

Incidentally, when the main phases 12 and the sub-phases 14 of the ferrite composition 11 according to the present embodiment are crystal grains, they preferably have an average crystal grain size of 0.2 to 1.5 μm. The average crystal grain size is measured by any method, such as XRD.

In addition to the element analysis by the above-mentioned EPMA, STEM-EDS, or the like, the presence of the $Zn_2SiO_4$ phase can also be confirmed by X-ray diffraction.

Hereinafter, explained are a definition and a measurement method of the amount of $Zn_2SiO_4$.

An X-ray diffraction intensity of a ferrite composition is measured by an X-ray diffraction device, and a peak intensity $I_A$ of (311) plane of spinel-type ferrite and a peak intensity $I_B$ of (113) plane of $Zn_2SiO_4$ in the ferrite composition 11 are measured. The amount of $Zn_2SiO_4$ phase is a value ($I_B/I_A$) obtained by dividing the intensity $I_B$ by the intensity $I_A$. Incidentally, the X-ray diffraction intensity is a value obtained by subtracting background from the intensity shown by the X-ray diffraction device.

Preferably, the amount of $Zn_2SiO_4$ ($I_B/I_A$) is 0.05 or more. The amount of $Zn_2SiO_4$ has any upper limit, but $I_B/I_A$ is preferably 0.6 or less.

Next, a method of manufacturing the ferrite composition according to the present embodiment is explained. Starting raw materials (raw materials of the main component and raw materials of the sub-component) are initially weighed to have a predetermined composition ratio. Incidentally, the starting raw materials preferably have an average grain size of 0.05 to 1.0 μm.

The raw materials of the main component can be iron oxide ($\alpha$-$Fe_2O_3$), copper oxide (CuO), nickel oxide (NiO), zinc oxide (ZnO), a composite oxide, etc. This composite oxide is, for example, zinc silicate ($Zn_2SiO_4$). Moreover, it is possible to use various compounds or so to be the above-mentioned oxides or composite oxide by firing.

Examples of materials to be the above-mentioned oxides by firing include metal single substance, carbonate, oxalate, nitrate, hydroxide, halide, and organometallic compound.

The raw materials of the sub-component can be silicon oxide, bismuth oxide, and cobalt oxide. The oxide to be the raw materials of the sub-component is not limited and can be a composite oxide or so. This composite oxide is, for example, zinc silicate ($Zn_2SiO_4$). Moreover, it is possible to use various compounds or so to be the above-mentioned oxides or composite oxide by firing. Examples of materials to be the above-mentioned oxides include metal single substance, carbonate, oxalate, nitrate, hydroxide, halide, and organometallic compound.

Incidentally, $Co_3O_4$ (a form of cobalt oxide) is favorable as a raw material of the cobalt compound because $Co_3O_4$ is easily stored and handled and is stable in terms of valence even in the air.

Next, iron oxide, copper oxide, nickel oxide, and zinc oxide (the raw materials of the main component) are mixed to obtain a raw material mixture. Among the above-mentioned raw materials of the main component, zinc oxide may not be added at this stage and may be added along with zinc silicate after the raw material mixture is calcined. On the contrary, at this stage, a part of the raw materials of the sub-component may be mixed with the raw materials of the main component. The existence ratio of the main phases, the first sub-phases, the second sub-phases, and the grain boundary phases can be controlled by appropriately controlling the kind and ratio of the raw materials contained in the raw material mixture and the kind and ratio of the raw materials added after the raw material mixture is calcined.

Specifically, the larger the amount of $Zn_2SiO_4$ added after calcination is, the larger the area ratio of the first sub-phases tends to be. Moreover, the larger the amount of $SiO_2$ added after calcination is, the larger the area ratio of the second sub-phases tends to be. Moreover, the smaller the amount of ZnO in the raw material mixture is, the larger the area ratio of the second sub-phases or the grain boundary phases tends to be.

The mixing is carried out by any method, such as a wet mixing using a ball mill and a dry mixing using a dry mixer.

Next, the raw material mixture is calcined to obtain a calcined material. The calcination causes thermal decomposition of the raw materials, homogenization of the components, generation of ferrite, disappearance of ultrafine powder by sintering, and grain growth to appropriate grain size and is carried out for conversion of the raw material mixture into a form suitable to the following steps. There is no limit to the calcination time or the calcination temperature. The calcination is normally carried out in the atmosphere (air), but may be carried out in an atmosphere whose partial pressure of oxygen is lower than that of the atmosphere.

Next, the calcined material is mixed with silicon oxide, bismuth oxide, cobalt oxide, zinc silicate, etc. to be the raw materials of the sub-component so as to manufacture a mixed calcined material. In particular, the larger the amount of zinc silicate added at this stage is, the more easily the existence ratio of the first sub-phases ($Zn_2SiO_4$ phases) becomes high. Moreover, the larger the amount of zinc silicate added at this stage is, the more easily the above-mentioned concentration distribution is generated in the main phases 12. Moreover, the smaller the amount of Zn in the calcined material is, the more easily the existence ratio of the grain boundary phases ($SiO_2$ phases and $Bi_2O_3$ phases) becomes high. This is because when the amount of Zn in the calcined material is small, Zn of $Zn_2SiO_4$ is easily solid-soluted into the main phases during firing, and $SiO_2$ is generated in the grain boundary phases. Moreover, the larger the amount of silicon oxide added at this stage is, the more easily the existence ratio of the second sub-phases ($SiO_2$ phases) becomes high.

Next, the mixed calcined material is pulverized to obtain a pulverized calcined material. The pulverization is carried out for crushing the aggregation of the mixed calcined material and turning it into a powder having an appropriate sinterability. When the mixed calcined material forms a large lump, a rough pulverization is carried out, and a wet pulverization is thereafter carried out using a ball mill, an attritor, or the like. The wet pulverization is carried out until the pulverized calcined material preferably has an average grain size of about 0.1 to 1.0

Hereinafter, explained is a method of manufacturing the multilayer chip coil 1 shown in FIG. 1 using the above-mentioned pulverized material after the wet pulverization.

The multilayer chip coil 1 shown in FIG. 1 can be manufactured by a normal method. That is, the chip body 4 can be formed in such a manner that an internal-electrode paste containing Ag or so and a ferrite paste obtained by kneading the pulverized calcined material with a binder and a solvent are alternately printed and laminated and are thereafter fired (printing method). Instead, the chip body 4 may be formed in such a manner that the internal-electrode paste is printed on green sheets manufactured using the ferrite paste, and the green sheets are laminated and fired (sheet method). In anyway, the terminal electrodes 5 are formed by firing, plating, or the like after the chip body is formed.

Each amount of the binder and the solvent in the ferrite paste is not limited. For example, when the entire ferrite paste is 100 wt %, the amount of the binder can be about 1 to 10 wt %, and the amount of the solvent can be about 10 to 50 wt %. If necessary, the ferrite paste may contain 10 wt % or less of dispersant, plasticizer, dielectric, insulator, etc. The internal-electrode paste containing Ag or so can be manufactured in a similar manner. The firing conditions are not limited, but when the internal electrode layers contain Ag or so, the firing temperature is preferably 930° C. or less, more preferably 900° C. or less.

Incidentally, the present invention is not limited to the above-mentioned embodiment and can variously be changed within the scope of the present invention.

Figure 2:
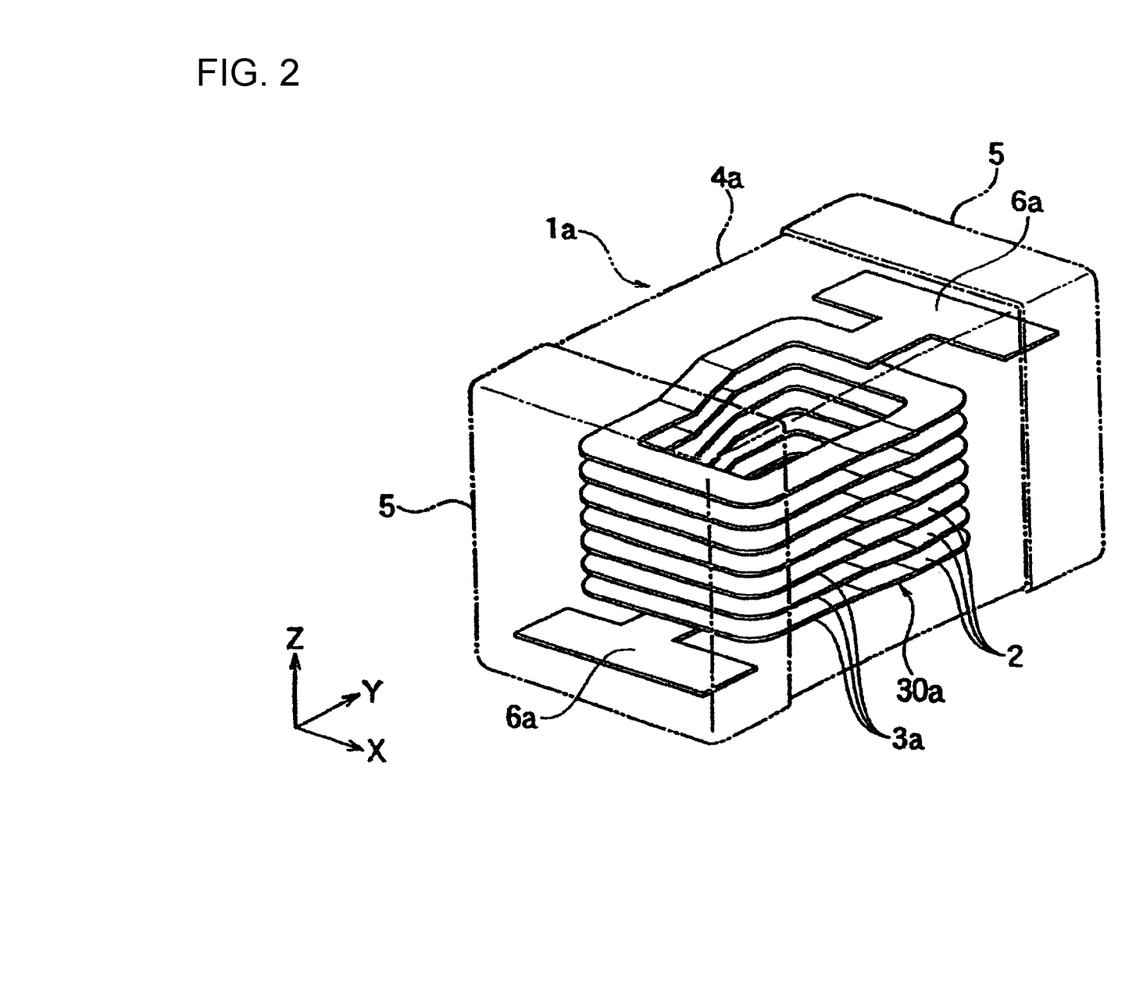
FIG. 2 is an internally transparent perspective view of a multilayer chip coil as an electronic component according to another embodiment of the present invention.

For example, the ceramic layers 2 of a multilayer chip coil 1a shown in FIG. 2 may be constituted by the ferrite composition of the above-mentioned embodiment. The multilayer chip coil 1a shown in FIG. 2 includes a chip body 4a containing the ceramic layers 2 and internal electrode layers 3a alternately laminated in the Z-axis direction.

Each of the internal electrode layers 3a has a square ring shape, a C shape, or a U shape. The internal electrode layers 3a are spirally connected by a stepped electrode or a through hole electrode (not shown) for connecting internal electrodes going through the adjacent ceramic layers 2 and constitute a coil conductor 30a.

Terminal electrodes 5 and 5 are formed on both ends of the chip body 4a in the Y-axis direction and are connected with ends of leading electrodes 6a located above and below in the Z-axis direction. The terminal electrodes 5 and 5 are connected with both ends of the coil conductor 30a forming a closed-magnetic-path coil.

In the present embodiment, the ceramic layers 2 and the internal electrode layers 3 are laminated in the Z-axis direction, and the end surfaces of the terminal electrodes 5 and 5 are parallel to the X-axis and the Z-axis. The X-axis, the Y-axis, and the Z-axis are perpendicular to each other. In the multilayer chip coil 1a shown in FIG. 2, the winding axis of the coil conductor 30a substantially corresponds to the Z-axis.

In the multilayer chip coil 1 shown in FIG. 1, the winding axis of the coil conductor 30 is in the Y-axis direction (the longitudinal direction of the chip body 4). Thus, compared to the multilayer chip coil 1a shown in FIG. 2, the multilayer chip coil 1 shown in FIG. 1 can have a large winding number and is advantageous in easy achievement of high impedance up to high frequency band. In the multilayer chip coil 1a shown in FIG. 2, other features and effects are similar to those of the multilayer chip coil 1 shown in FIG. 1.

The ferrite composition according to the present embodiment can be used for electronic components other than the multilayer chip coil shown in FIG. 1 or FIG. 2. For example, the ferrite composition according to the present embodiment can be used as ceramic layers laminated along with a coil conductor. In addition, the ferrite composition according to the present embodiment can be used for a composite electronic component formed by combining a coil, such as LC composite component, with other elements, such as capacitors.

The multilayer chip coil using the ferrite composition according to the present embodiment is used for any purposes, but is favorably used for, for example, a circuit where a winding-wire-type ferrite inductor is conventionally used so as to flow a particularly high AC current, such as a circuit of ICT devices (e.g., smart phones) using NFC technology, non-contact power supply, etc.

EXAMPLES

Hereinafter, the present invention is explained based on more detailed examples, but is not limited to the following examples.

Experimental Example 1

As raw materials of a main component, $Fe_2O_3$, NiO, CuO, and ZnO were prepared. As raw materials of a sub-component, $SiO_2$, $Bi_2O_3$, and $Co_3O_4$ were prepared. Incidentally, the starting raw materials had an average grain size of 0.05 to 1.00 μm.

Next, powders of the prepared raw materials of the main component and the sub-component were weighed to have the compositions shown in Table 1 to Table 6 as sintered bodies.

After the weighing, $Fe_2O_3$, NiO, CuO, and if necessary, a part of ZnO from the prepared raw materials of the main component were mixed in a wet manner in a ball mill for 16 hours, and a raw material mixture was obtained.

Next, the obtained raw material mixture was dried and thereafter calcined in the air, and a calcined material was obtained. The calcination temperature was appropriately selected from 500 to 900° C. according to the composition of the raw material mixture. After that, the calcined material was added with the balance of ZnO, which had not been mixed in the wet mixture step, and $SiO_2$ as a form of a compound of $Zn_2SiO_4$ and was pulverized in a ball mill while further being added with other constituents of the sub-component or so. Then, a pulverized calcined material was obtained.

The amount of the balance of ZnO added to the calcined material was 1.0 to 3.0 times (in terms of mol) larger than the amount of $SiO_2$ added to the calcined material.

After the pulverized calcined material was dried, 100 parts by weight of the pulverized calcined material were added with 10.0 parts by weight of a polyvinyl alcohol aqueous solution (weight concentration: 6%) as a binder and were granulated to be granules. These granules were pressed to obtain a pressed body having a toroidal shape (size: outer diameter 13 mm×inner diameter 6 mm×height 3 mm) and a pressed body having a disk shape (size: outer diameter 12 mm×height 2 mm).

Next, the pressed bodies were fired in the air for two hours at 860 to 900° C., which is equal to or lower than the melting point of Ag (962° C.), and a toroidal core sample and a disk sample as sintered bodies were obtained. Moreover, the following characteristic evaluation was carried out for each of the obtained samples. Incidentally, an X-ray fluorescence analyzer confirmed that there was almost no change in composition between the weighed raw material powders and the fired pressed bodies.

Resistivity ρ

In—Ga electrodes were applied on both surfaces of the disk sample, and a DC resistance value was measured to obtain a resistivity ρ (unit: Ω·m). This measurement was carried out using an IR meter (4329A manufactured by HEWLETT PACKARD). In the present examples, a resistivity ρ of $1.0 \times 10^6$ Ω·m or more (1.0.E+06 Ω·m or more) was considered to be favorable.

Permeability μ'

A permeability μ' of the toroidal core sample was measured using an RF impedance material analyzer (E4991A manufactured by Agilent Technologies). As the measurement conditions, the measurement frequency was 10 MHz, and the measurement temperature was 25° C. A permeability μ' of 3.0 or more was considered to be favorable.

DC Superposition Characteristics

A copper wire was wound around the toroidal core sample by 30 turns, and a permeability μ' at application of DC current was measured using an LCR meter (4284A manufactured by HEWLETT PACKARD). As the measurement conditions, the measurement frequency was 1 MHz, and the measurement temperature was 25° C. The permeability was measured while the applied DC current was changed from 0 to 8 A and was graphed with the horizontal axis of DC current and the vertical axis of permeability. Then, an electric current value when the permeability decreased by 10% compared to 0 A of DC current was obtained as an Idc.

When the permeability decreased by 10% at 8 A or less (applied DC current), the DC current at 10% decrease in permeability was an Idc. When the permeability did not decrease by 10% at 8 A (applied DC current), an Idc was calculated from a gradient of the graph at 8 A (DC current). In the present examples, when the Idc was 10.0 A or more, DC superposition characteristics were considered to be favorable.

Density

A density of the sintered ferrite composition was calculated from a size and a weight of the fired sintered body of the toroidal core sample. When the density was 4.40 g/cm³ or more, sinterability was considered to be favorable.

Observation of Ferrite Composition

The sintered ferrite compositions (toroidal core samples) were observed by an EPMA and a STEM-EDS. The observation magnification was 20000 times or more and was appropriately determined depending on each of examples and comparative examples. Then, confirmed was whether or not each of the ferrite compositions contained a main phase composed of spinel ferrite phase, a first sub-phase composed of $Zn_2SiO_4$ phase, a second sub-phase composed of $SiO_2$ phase, and a grain boundary phase composed of $SiO_2$ phase. Moreover, the area ratios of the main phases, the first sub-phases, the second sub-phases, and the grain boundary phases were calculated from the observation result by the STEM-EDS. In each example of Table 1 to Table 6, the first sub-phases had an area of 25% or more and 75% or less, the second sub-phases had an area of 0.1% or more and 15% or less, the main phases had an area of 25% or more and 55% or less, and the grain boundary phases had an area of 0.01% or more and 5% or less.

Amount of $Zn_2SiO_4$

An amount of $Zn_2SiO_4$ was determined by measuring $I_B/I_A$ of the sintered ferrite composition using an X-ray diffraction device (X'Pert PRO MPD CuKα line manufactured by Panarytical).

AC Resistance

As for an AC resistance (Rac), a copper wire was wound around the toroidal core sample on the primary side by six turns and on the secondary side by three turns. During the measurement, the measurement frequency was 3 MHz, and the AC current value was 1.6 Arms. A B-H analyzer (SY-8218 manufactured by IWATSU ELECTRIC CO., LTD.) and an amplifier (4101-IW manufactured by NF CORPORATION) were used. An AC resistance Rac of 15.0 mΩ or less was considered to be favorable.

TABLE 1

| No | Ex. or Comp. Ex. | Main Component (mol %) | | | | Sub-component (pts.wt.) | | | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 1a | Comp. Ex. | 9.8 | 28.4 | 5.0 | 56.8 | 0.1 | 14.8 | 1.7 | 0.0077 | 19.2 | 5.3.E+08 | 4.62 | 2.8 | 7.4 | 0.370 |
| 1 | Ex. | 10.0 | 28.2 | 5.0 | 56.8 | 0.1 | 14.8 | 1.7 | 0.0077 | 19.0 | 2.5.E+08 | 4.60 | 3.0 | 7.6 | 0.366 |
| 2a | Ex. | 20.7 | 17.5 | 5.0 | 56.8 | 0.1 | 14.8 | 1.7 | 0.0077 | 15.7 | 5.0.E+08 | 4.57 | 3.4 | 8.0 | 0.330 |
| 2 | Ex. | 23.3 | 14.9 | 5.0 | 56.8 | 0.1 | 14.8 | 1.7 | 0.0077 | 15.2 | 2.4.E+08 | 4.49 | 3.6 | 8.2 | 0.317 |
| 2b | Ex. | 34.3 | 3.9 | 5.0 | 56.8 | 0.1 | 14.8 | 1.7 | 0.0077 | 11.9 | 7.3.E+07 | 4.55 | 4.3 | 8.5 | 0.244 |
| 3 | Ex. | 38.0 | 0.2 | 5.0 | 56.8 | 0.1 | 14.8 | 1.7 | 0.0077 | 10.7 | 2.5.E+06 | 4.57 | 4.6 | 7.2 | 0.203 |
| 3a | Comp. Ex. | 38.1 | 0.1 | 5.0 | 56.8 | 0.1 | 14.8 | 1.7 | 0.0077 | 9.9 | 8.0.E+05 | 4.55 | 4.7 | 9.3 | 0.199 |

TABLE 2

| No | Ex. or Comp. Ex. | Main Component (mol %) | | | | Sub-component (pts.wt.) | | | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| | | Fe2O3 | NiO | CuO | ZnO | Co3O4 | SiO2 | Bi2O3 | | | | | | | |
| 4a | Comp. Ex. | 10.3 | 47.2 | 3.6 | 38.9 | 0.1 | 22.0 | 1.2 | 0.0052 | 9.8 | 6.3.E+08 | 4.68 | 6.3 | 15.9 | 0.366 |
| 4 | Ex. | 10.3 | 47.0 | 3.6 | 39.1 | 0.1 | 22.0 | 1.2 | 0.0052 | 10.2 | 8.7.E+08 | 4.67 | 6.0 | 13.0 | 0.374 |

TABLE 2-continued

| No | Ex. or Comp. Ex. | Main Component (mol %) Fe2O3 | NiO | CuO | ZnO | Sub-component (pts.wt.) Co3O4 | SiO2 | Bi2O3 | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| 5a | Ex. | 10.3 | 39.9 | 3.6 | 46.2 | 0.1 | 22.0 | 1.2 | 0.0052 | 16.5 | 9.6.E+08 | 4.65 | 5.8 | 12.1 | 0.380 |
| 5b | Ex. | 10.3 | 29.3 | 3.6 | 56.8 | 0.1 | 22.0 | 1.2 | 0.0052 | 24.7 | 5.3.E+08 | 4.58 | 4.8 | 10.5 | 0.410 |
| 5 | Ex. | 10.3 | 26.1 | 3.6 | 60.0 | 0.1 | 22.0 | 1.2 | 0.0052 | 26.7 | 1.5.E+08 | 4.56 | 4.4 | 8.5 | 0.426 |
| 5c | Ex. | 10.3 | 24.3 | 3.6 | 61.8 | 0.1 | 22.0 | 1.2 | 0.0052 | 27.3 | 1.2.E+08 | 4.54 | 4.2 | 8.3 | 0.431 |
| 6 | Ex. | 10.3 | 6.1 | 3.6 | 80.0 | 0.1 | 22.0 | 1.2 | 0.0052 | 31.0 | 6.8.E+08 | 4.46 | 3.1 | 4.2 | 0.483 |
| 6a | Comp. Ex. | 10.3 | 5.6 | 3.6 | 80.5 | 0.1 | 22.0 | 1.2 | 0.0052 | 31.3 | 7.1.E+08 | 4.45 | 2.8 | 4.1 | 0.498 |

TABLE 3

| No | Ex. or Comp. Ex. | Main component (mol %) Fe2O3 | NiO | CuO | ZnO | Sub-component (pts.wt.) Co3O4 | SiO2 | Bi2O3 | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| 7a | Comp. Ex. | 20.7 | 15.5 | 2.0 | 61.8 | 0.1 | 17.1 | 1.5 | 0.0058 | 18.7 | 4.0.E+05 | 4.39 | 2.8 | 10.1 | 0.105 |
| 7 | Ex. | 20.7 | 14.5 | 3.0 | 61.8 | 0.1 | 17.1 | 1.5 | 0.0058 | 23.9 | 5.2.E+06 | 4.54 | 3.3 | 7.1 | 0.107 |
| 8a | Ex. | 20.7 | 13.9 | 3.6 | 61.8 | 0.1 | 17.1 | 1.5 | 0.0058 | 24.5 | 7.2.E+06 | 4.55 | 3.3 | 7.1 | 0.103 |
| 8 | Ex. | 20.7 | 12.9 | 4.6 | 61.8 | 0.1 | 17.1 | 1.5 | 0.0058 | 25.0 | 3.0.E+09 | 4.56 | 3.3 | 7.4 | 0.109 |
| 8b | Ex. | 20.7 | 11.6 | 5.9 | 61.8 | 0.1 | 17.1 | 1.5 | 0.0058 | 24.1 | 5.7.E+08 | 4.58 | 3.3 | 7.2 | 0.109 |
| 9 | Ex. | 20.7 | 6.5 | 11.0 | 61.8 | 0.1 | 17.1 | 1.5 | 0.0058 | 19.8 | 1.3.E+06 | 4.59 | 3.5 | 5.9 | 0.102 |
| 9a | Comp. Ex. | 20.7 | 6.5 | 12.0 | 61.8 | 0.1 | 17.1 | 1.5 | 0.0058 | 19.0 | 3.3.E+05 | 4.59 | 3.5 | 10.5 | 0.110 |

TABLE 4

| No | Ex. or Comp. Ex. | Main Component (mol %) Fe2O3 | NiO | CuO | ZnO | Sub-component (pts.wt.) Co3O4 | SiO2 | Bi2O3 | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| 10a | Comp. Ex. | 34.3 | 20.8 | 5.9 | 39.1 | 1.0 | 9.0 | 1.5 | 0.1067 | 9.2 | 7.9.E+09 | 4.78 | 6.5 | 15.2 | 0.145 |
| 10 | Ex. | 34.3 | 20.8 | 5.9 | 39.1 | 1.0 | 10.0 | 1.5 | 0.0960 | 10.1 | 1.2.E+09 | 4.71 | 5.7 | 14.8 | 0.146 |
| 11a | Ex. | 34.3 | 20.8 | 5.9 | 39.1 | 1.0 | 14.8 | 1.5 | 0.0649 | 14.8 | 6.6.E+09 | 4.71 | 4.7 | 13.1 | 0.149 |
| 11 | Ex. | 34.3 | 20.8 | 5.9 | 39.1 | 1.0 | 17.0 | 1.5 | 0.0565 | 19.3 | 3.1.E+09 | 4.68 | 4.4 | 11.6 | 0.150 |
| 11b | Ex. | 34.3 | 20.8 | 5.9 | 39.1 | 1.0 | 22.0 | 1.5 | 0.0436 | 27.8 | 5.5.E+09 | 4.67 | 3.4 | 11.8 | 0.152 |
| 12 | Ex. | 34.3 | 20.8 | 5.9 | 39.1 | 1.0 | 23.0 | 1.5 | 0.0417 | 31.1 | 5.5.E+09 | 4.67 | 3.1 | 11.6 | 0.152 |
| 12a | Comp. Ex. | 34.3 | 20.8 | 5.9 | 39.1 | 1.0 | 24.0 | 1.5 | 0.0400 | 32.2 | 5.8.E+08 | 4.60 | 2.6 | 11.0 | 0.153 |

TABLE 5

| No | Ex. or Comp. Ex. | Main Component (mol %) Fe2O3 | NiO | CuO | ZnO | Sub-component (pts. wt.) Co3O4 | SiO2 | Bi2O3 | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| 13 | Ex. | 23.3 | 14.9 | 5.0 | 56.8 | 0.0 | 14.8 | 1.7 | 0.0000 | 14.3 | 3.2.E+08 | 4.58 | 3.8 | 7.4 | 0.326 |
| 2 | Ex. | 23.3 | 14.9 | 5.0 | 56.8 | 0.1 | 14.8 | 1.7 | 0.0077 | 15.2 | 2.4.E+08 | 4.49 | 3.6 | 8.2 | 0.317 |
| 14a | Ex. | 23.3 | 14.9 | 5.0 | 56.8 | 1.0 | 14.8 | 1.7 | 0.0674 | 18.9 | 7.5.E+08 | 4.52 | 3.3 | 7.7 | 0.327 |
| 14 | Ex. | 23.3 | 14.9 | 5.0 | 56.8 | 3.0 | 14.8 | 1.7 | 0.2022 | 23.0 | 5.7.E+08 | 4.62 | 3.0 | 7.4 | 0.322 |
| 14b | Comp. Ex. | 23.3 | 14.9 | 5.0 | 56.8 | 5.0 | 14.8 | 1.7 | 0.3369 | 23.1 | 7.3.E+08 | 4.52 | 2.7 | 7.7 | 0.318 |

TABLE 6

| No | Ex. or Comp. Ex. | Main Component (mol %) Fe2O3 | NiO | CuO | ZnO | Sub-component (pts. wt.) Co3O4 | SiO2 | Bi2O3 | Co3O4/SiO2 (weight ratio) | Idc (A) | ρ (Ωm) | Density (g/cm3) | μ' | Rac (mΩ) | IB/IA |
|---|---|---|---|---|---|---|---|---|---|---|---|---|---|---|---|
| 15a | Comp. Ex. | 23.3 | 14.9 | 5.0 | 56.8 | 0.1 | 14.8 | 0.0 | 0.0077 | 21.1 | 9.2.E+05 | 4.38 | 2.9 | 11.1 | 0.343 |
| 15 | Ex. | 23.3 | 14.9 | 5.0 | 56.8 | 0.1 | 14.8 | 0.1 | 0.0077 | 23.0 | 2.3.E+06 | 4.41 | 3.1 | 11.6 | 0.324 |
| 15b | Ex. | 23.3 | 14.9 | 5.0 | 56.8 | 0.1 | 14.8 | 1.2 | 0.0077 | 18.4 | 4.5.E+07 | 4.47 | 3.4 | 9.8 | 0.400 |
| 2 | Ex. | 23.3 | 14.9 | 5.0 | 56.8 | 0.1 | 14.8 | 1.7 | 0.0077 | 15.2 | 2.4.E+08 | 4.49 | 3.6 | 8.2 | 0.317 |
| 16 | Ex. | 23.3 | 14.9 | 5.0 | 56.8 | 0.1 | 14.8 | 3.0 | 0.0077 | 14.9 | 4.9.E+06 | 4.58 | 3.0 | 10.2 | 0.381 |
| 16a | Comp. Ex. | 23.3 | 14.9 | 5.0 | 56.8 | 0.1 | 14.8 | 5.0 | 0.0077 | 9.9 | 5.4.E+05 | 4.55 | 2.8 | 15.4 | 0.402 |

In Table 1, the amount of $Fe_2O_3$ and the amount of NiO were mainly changed. All characteristics were favorable in a sample whose all constituents of the main component and the sub-component were in the predetermined ranges. On the other hand, the permeability μ' was too low in Sample No. 1a (the amount of $Fe_2O_3$ was too small). In Sample No. 3a (the amount of $Fe_2O_3$ was too large), the DC superposition characteristics were bad, and the resistivity ρ was too low.

In Table 2, the amount of ZnO and the amount of NiO were mainly changed. All characteristics were favorable in a sample whose all constituents of the main component and the sub-component were in the predetermined ranges. On the other hand, in Sample No. 4a (the amount of ZnO was too small), the DC superposition characteristics were bad, and the AC resistance Rac was too high. In Sample No. 6a (the amount of ZnO was too large), the permeability μ' was too low.

In Table 3, the amount of CuO and the amount of NiO were mainly changed. All characteristics were favorable in a sample whose all constituents of the main component and the sub-component were in the predetermined ranges. On the other hand, in Sample No. 7a (the amount of CuO was too small), the sinterability was bad, the resistivity ρ was too low, and the permeability μ' was too low. In Sample No. 9a (the amount of CuO was too large), the DC superposition characteristics were bad, and the resistivity ρ was too low.

In Table 4, the amount of $SiO_2$ was mainly changed. All characteristics were favorable in a sample whose all constituents of the main component and the sub-component were in the predetermined ranges. On the other hand, in Sample No. 10a (the amount of $SiO_2$ was too small), the DC superposition characteristics were bad, and the AC resistance Rac was too high. In Sample No. 12a (the amount of $SiO_2$ was too large), the sinterability was bad, and the permeability μ' was too low.

In Table 5, the amount of $Co_3O_4$ was mainly changed. All characteristics were favorable in a sample whose all constituents of the main component and the sub-component were in the predetermined ranges. On the other hand, the permeability μ' was too low in Sample No. 14b (the amount of $Co_3O_4$ was too large).

In Table 6, the amount of $Bi_2O_3$ was mainly changed. All characteristics were favorable in a sample whose all constituents of the main component and the sub-component were in the predetermined ranges. On the other hand, in Sample No. 15a ($Bi_2O_3$ was not contained), the sinterability was bad, the resistivity ρ was too low, and the permeability μ' was too low. In Sample No. 16a (the amount of $Bi_2O_3$ was too large), the resistivity ρ was too low, the permeability μ' was too low, the DC superposition characteristics were bad, and the AC resistance Rac was too high.

Experimental Example 2

In Experimental Example 2, the area ratios of the main phase, the first sub-phase, the second sub-phase, and the grain boundary phase during EPMA observation were changed by changing the composition of the raw material mixture and the kind and/or amount of additives added after the calcination without changing the composition of Sample No. 2 of Experimental Example 1. The results are shown in Table 7.

Specifically, in Sample No. 21, the amount of ZnO in the raw material mixture was increased compared to Sample No. 2, and $SiO_2$ and ZnO were added to the calcined material. The compound of $Zn_2SiO_4$ was not added. Incidentally, the amount of ZnO in the raw material mixture was more than 10 mol %.

In Sample No. 22, the amount of ZnO in the raw material mixture was increased compared to Sample No. 2, the compound of $Zn_2SiO_4$, $SiO_2$, and if necessary, ZnO were added to the calcined material. Incidentally, the amount of ZnO in the raw material mixture was 10 mol % or less.

In Sample No. 23, $SiO_2$ and ZnO were added instead of $Zn_2SiO_4$, which was added to the calcined material in Sample No. 2. Incidentally, the amount of ZnO in the raw material mixture was 10 mol % or less.

In Sample No. 24, the amount of ZnO in the raw material mixture was increased compared to Sample No. 2, and the compound of $Zn_2SiO_4$ and $SiO_2$ were added to the calcined material. Incidentally, the amount of ZnO in the raw material mixture was more than 10 mol %.

TABLE 7

| No | Ex. or Comp. Ex. | Area Ratios (%) Main Phase | First Sub-phase | Second Sub-phase | Grain Boundary Phase | Total of Sub-phases | Idc (A) | P (Ωm) | Density (g/cm3) | μ' | Rac (mΩ) | IB/IA |
|---|---|---|---|---|---|---|---|---|---|---|---|---|
| 2 | Ex. | 43.7 | 50.9 | 3.6 | 1.8 | 54.5 | 15.2 | 2.4.E+08 | 4.49 | 3.6 | 8.2 | 0.317 |
| 21 | Ex. | 47.2 | 6.1 | 45.0 | 1.7 | 51.1 | 10.2 | 3.1.E+08 | 4.41 | 3.7 | 14.9 | 0.051 |
| 22 | Ex. | 46.0 | 26.0 | 25.5 | 2.5 | 51.5 | 13.5 | 3.3.E+08 | 4.46 | 3.9 | 10.2 | 0.189 |
| 23 | Ex. | 47.0 | 9.1 | 41.8 | 2.1 | 53.0 | 10.9 | 2.4.E+08 | 4.42 | 3.6 | 14.0 | 0.089 |
| 24 | Ex. | 48.4 | 25.1 | 25.0 | 1.5 | 51.6 | 12.1 | 3.3.E+08 | 4.45 | 3.8 | 10.8 | 0.164 |

According to Table 7, the favorable results were obtained even though the area ratios of the main phase, the first sub-phase, the second sub-phase, and the grain boundary phase were changed. In particular, the higher the area ratio of the first sub-phase composed of $Zn_2SiO_4$ was, the further the inductance characteristics tended to be improved, and the further the DC superposition characteristics and the AC resistance Rac also tended to be favorable. Moreover, the higher the area ratio of the grain boundary phase composed of $Bi_2O_3$ and $SiO_2$ was, the further the inductance characteristics tended to be improved, and the further the DC superposition characteristics and the AC resistance Rac also tended to be favorable.

DESCRIPTION OF THE REFERENCE NUMERICAL 1, 1a . . . multilayer chip coil
2 . . . ceramic layer
3, 3a . . . internal electrode layer
4, 4a . . . chip body
5 . . . terminal electrode 6 . . . terminal-connection through hole electrode
6a . . . leading electrode
11 . . . ferrite composition
12 . . . main phase (spinel ferrite phase)
14 . . . sub-phase (low a phase)
14a . . . first sub-phase ($Zn_2SiO_4$ phase)
14b . . . second sub-phase ($SiO_2$ phase)
16 . . . grain boundary phase ($Bi_2O_3$ phase and $SiO_2$ phase)
30, 30a . . . coil conductor

What is claimed is:

1. A ferrite composition comprising a main component and a sub-component, wherein the main component includes 10.0 to 38.0 mol % of a Fe compound in terms of $Fe_2O_3$, 3.0 to 11.0 mol % of a Cu compound in terms of CuO, 46.2 to 61.8 mol % of a Zn compound in terms of ZnO, and a balance of a Ni compound, and the sub-component includes 10.0 to 23.0 parts by weight of a Si compound in terms of $SiO_2$, 0 to 3.0 parts by weight (including 0 parts by weight) of a Co compound in terms of $Co_3O_4$, and 0.1 to 3.0 parts by weight of a Bi compound in terms of $Bi_2O_3$ with respect to 100 parts by weight of the main component.

2. The ferrite composition according to claim 1, the sub-component includes 0.1 to 1.0 parts by weight of a Co compound in terms of $Co_3O_4$.

3. The ferrite composition according to claim 1, comprising a main phase composed of spinel ferrite, a first sub-phase including a $Zn_2SiO_4$ phase, and a grain boundary phase including a $SiO_2$ phase.

4. The ferrite composition according to claim 3, further comprising a second sub-phase composed of $SiO_2$ phase.

5. A multilayer electronic component comprising a coil conductor and ceramic layers, wherein the ceramic layers are composed of the ferrite composition according to claim 1.

* * * * *